(12) United States Patent
Miura et al.

(10) Patent No.: US 8,957,924 B2
(45) Date of Patent: Feb. 17, 2015

(54) LIQUID CRYSTAL DISPLAY DEVICE

(75) Inventors: Satoshi Miura, Osaka (JP); Yukihide Kohtoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

(21) Appl. No.: 13/807,753

(22) PCT Filed: Jul. 1, 2011

(86) PCT No.: PCT/JP2011/065202
§ 371 (c)(1),
(2), (4) Date: Dec. 31, 2012

(87) PCT Pub. No.: WO2012/005190
PCT Pub. Date: Jan. 12, 2012

(65) Prior Publication Data
US 2013/0093806 A1 Apr. 18, 2013

(30) Foreign Application Priority Data
Jul. 9, 2010 (JP) ................. 2010-156907

(51) Int. Cl.
G09G 5/10 (2006.01)
G09G 3/36 (2006.01)
F21V 8/00 (2006.01)
G02F 1/1335 (2006.01)
G09G 3/34 (2006.01)
G02F 1/133 (2006.01)

(52) U.S. Cl.
CPC ............ *G09G 3/3611* (2013.01); *G02B 6/0028* (2013.01); *G02F 1/133615* (2013.01); *G09G 3/3406* (2013.01); *G02B 6/0038* (2013.01); *G02F 1/13318* (2013.01); *G02F 2001/133618* (2013.01); *G02F 2001/133626* (2013.01); *G09G 2320/0626* (2013.01); *G09G 2360/144* (2013.01)
USPC ........................................................ 345/690

(58) Field of Classification Search
None
See application file for complete search history.

(56) References Cited

U.S. PATENT DOCUMENTS
2011/0261280 A1* 10/2011 Yu ................................... 349/58

FOREIGN PATENT DOCUMENTS
JP 08-292726 A 11/1996

OTHER PUBLICATIONS

Official Communication issued in International Patent Application No. PCT/JP2011/065202, mailed on Aug. 16, 2011.

* cited by examiner

*Primary Examiner* — Nicholas Lee
(74) *Attorney, Agent, or Firm* — Keating & Bennett, LLP

(57) ABSTRACT

A light-collecting type liquid crystal display device capable of displaying an image properly is provided. The liquid crystal display device 100 includes a liquid crystal panel 10; an irradiation section 31, a control device 61, and a plate-like member 20 attached to a part (10*a*) of the liquid crystal panel 10. A light guiding section 40 for collecting natural light 51 and propagating the light is located on a first surface 21 of the plate-like member 20; and the light guiding section 40 is connected to the irradiation section 31. A plurality of optical sensors 46 are provided on the first surface 21 of the plate-like member 20. The irradiation section 31 includes a plurality of LED elements 30. The control device 61 is connected to an LED driving section 63. The control device 61 is connected to the optical sensors 46. The control device 61 is structured to control an amount of light to be emitted from each of the plurality of LED elements 30 by use of the LED driving section 63 based on the amounts of light detected by the optical sensors 46.

11 Claims, 13 Drawing Sheets

LIQUID CRYSTAL DISPLAY DEVICE

TECHNICAL FIELD

The present invention relates to a liquid crystal display device, and specifically to a liquid crystal display device for collecting natural light and using the natural light as backlight.

The present application claims the benefit of priority based upon Japanese Patent Application No. 2010-156907 filed on Jul. 9, 2010, the entirety of which is incorporated herein by reference.

BACKGROUND ART

Recently, digital signage is a target of attention. "Digital signage" is a form of information communication medium using digital technologies. Digital signage is mainly installed in places where many people gather outside general houses (e.g., stations and airports, shopping malls, public facilities, etc.) to display advertisements, news and other information in the form of images such as still images, moving images, subtitles and the like. As specific devices which realize digital signage, liquid crystal display devices are preferably used.

A liquid crystal display device includes a liquid crystal panel, which includes a pair of light-transmissive substrates and liquid crystal molecules enclosed therebetween, and a backlight unit located on a rear surface of the liquid crystal panel. With the liquid crystal display device, light emitted by the backlight unit is directed from the rear side of the liquid crystal panel, and thus an image displayed on the liquid crystal panel is made visually recognizable. When such a liquid crystal display device is used for digital signage, images such as still images, moving images, subtitles and the like can be displayed with bright colors and a high degree of freedom of expression. This significantly improves the ability of expression of digital signage as an information communication medium.

However, when a liquid crystal display device is used for digital signage, there is a problem that the initial cost at the time of installment and also the running cost are high. A main reason for the high running cost is a high power consumption of a light source built in the backlight unit described above. Recently, the size of the display screen of a liquid crystal display device is significantly increased. In a liquid crystal display device including such a large display screen, the power consumption of the light source built in the backlight unit is likely to be increased. Recently, a light emitting diode (LED), which consumes a relatively small amount of power, has been used as a light source of the backlight unit. Nonetheless, the power consumption needs to be further reduced, considering that the liquid crystal display device is used for a long term.

Thus, a liquid crystal display device which generates power by use of a solar panel and uses the generated power to drive the light source and thus decreases the power consumption has been proposed. However, when this liquid crystal display device is used for digital signage, there is a problem that the installment cost is high because the solar panel costs relatively high. In addition, the solar panel does not necessarily have a long life and thus needs to be replaced periodically. This causes another problem that the running cost results in being high.

Aside from a liquid crystal display device used for digital signage, it has been proposed that a display device for displaying still images such as signs or the like collects natural light such as sunlight or the like by a use of light collecting section and transports the light to a display panel by an optical fiber or the like, so that the light is used as backlight (see, for example, Patent Document 1). In the case where a liquid crystal panel is used as the display panel of the display device, the collected light can be used as it is as backlight of the liquid crystal panel. This can reduce the power consumption and also can extend the life of the liquid crystal panel. As a result, the running cost can be significantly decreased. With such a structure, the installment cost of the display device can be significantly decreased as compared with the case where the above-described liquid crystal display device including the solar panel is used.

CITATION LIST

Patent Document

Patent Document 1: Japanese Patent Laid-Open Publication No. 8-292726

SUMMARY OF THE INVENTION

Technical Problem

However, when the above-described light-collecting type liquid crystal display device is used for digital signage, there is a problem that natural light cannot be collected at night and thus the liquid crystal display device is used only in the daytime. There is another problem that when the amount of the collected natural light is insufficient even in the daytime due to the weather or environment, a sufficient level of luminance cannot be provided for displaying an image properly. Recently, there is a trend of increasing the size of the display screen of a liquid crystal display device. The latter problem is especially conspicuous when a liquid crystal display device including such a large display screen is used for digital signage.

The present invention made in light of such a situation has an object of providing a light-collecting type liquid crystal display device capable of displaying an image properly.

Solution to the Problem

A liquid crystal display device according to the present invention is a liquid crystal display device capable of displaying an image and includes a liquid crystal panel; an irradiation section for irradiating the liquid crystal panel with light; a control device for controlling driving of the liquid crystal panel; and a plate-like member attached to a part of the liquid crystal panel. A light guiding section for collecting natural light and propagating the light is located on a first surface of the plate-like member; the light guiding section is connected to the irradiation section; a plurality of optical sensors each for detecting an amount of light are provided on the first surface of the plate-like member; the irradiation section includes a plurality of LED elements; the control device is connected to an LED driving section for controlling an amount of light to be emitted from each of the plurality of LED elements; the control device is connected to the optical sensors; and the control device is structured to control an amount of light to be emitted from each of the plurality of LED elements by use of the LED driving section based on the amounts of light detected by the optical sensors.

In a preferable embodiment, the plate-like member is pivotable about a rotation shaft located in the vicinity of a top end of the liquid crystal panel; and a solar panel is located on a second surface of the plate-like member which is opposite to the first surface.

In a preferable embodiment, the control device is connected to a movable control section for controlling pivoting of the plate-like member; and the movable control section is structured to control the pivoting of the plate-like member in accordance with an orbit of the sun.

In a preferable embodiment, the irradiation section includes a light guiding plate; and the light guiding section is connected to the light guiding plate of the irradiation section.

In a preferable embodiment, the optical sensors are each formed of a photoelectric conversion element.

In a preferable embodiment, a front light receiving sensor for detecting an amount of natural light incident on a front surface of the liquid crystal display device is provided on the front surface; the liquid crystal panel is a semi-transmissive liquid crystal panel in which a transmission mode of using light from the irradiation section and a reflection mode of using the natural light from the front surface are switchable to each other; and the control device is structured to switch the liquid crystal panel to the transmission mode or to the reflection mode based on the amount of light detected by the front light receiving sensor.

In a preferable embodiment, the front light receiving sensor is located in a frame area of the liquid crystal panel.

In a preferable embodiment, the irradiation section is an edge-lit type backlight unit; and the control device adjusts the amount of light to be emitted from each of the plurality of LED elements located in the irradiation section such that a variance among the amounts of light detected by the optical sensors is alleviated.

In a preferable embodiment, the plate-like member is pivotable about the rotation shaft located in the vicinity of a top end of the liquid crystal panel; a solar panel is located on a second surface of the plate-like member which is opposite to the first surface; the control device is connected to a movable control section for controlling pivoting of the plate-like member; the movable control section is structured to control the pivoting of the plate-like member in accordance with an orbit of the sun; a front light receiving sensor for detecting an amount of natural light incident on a front surface of the liquid crystal display device is provided on the front surface; the liquid crystal panel is a semi-transmissive liquid crystal panel in which a transmission mode of using light from the irradiation section and a reflection mode of using the natural light from the front surface are switchable to each other; the control device is structured to switch the liquid crystal panel to the transmission mode or to the reflection mode based on the amount of light detected by the front light receiving sensor; and when the liquid crystal panel is switched to the transmission mode, the control device controls the pivoting of the plate-like member by use of the movable control section such that the first surface of the plate-like member receives the natural light from the sun; and when the liquid crystal panel is switched to the reflection mode, the control device controls the pivoting of the plate-like member by use of the movable control section such that the second surface of the plate-like member receives the natural light from the sun.

In a preferable embodiment, in a state where the liquid crystal panel is located in a vertical direction, the first surface of the plate-like member is located between the vertical direction and a horizontal direction.

In a preferable embodiment, the liquid crystal display device is a display device located outdoors for digital signage.

A method for controlling a liquid crystal display device according to the present invention is a method for displaying an image by collecting natural light and irradiating a rear surface of a liquid crystal panel with the collected light. The liquid crystal display device comprises a liquid crystal panel; an irradiation section for irradiating the liquid crystal panel with light; a control device for controlling driving of the liquid crystal panel; and a plate-like member attached to a part of the liquid crystal panel. A light guiding section for collecting natural light and propagating the light is located on a first surface of the plate-like member; the light guiding section is connected to the irradiation section; a plurality of optical sensors each for detecting an amount of light is provided on the first surface of the plate-like member; the irradiation section includes a plurality of LED elements; the control device is connected to an LED driving section for controlling an amount of light to be emitted from each of the plurality of LED elements; and the control device is connected to the optical sensors. The control device executes a step (a) of acquiring data on the amounts of light detected by the optical sensors; a step (b) of calculating a variance of the data on the amounts of light; and a step (c) of adjusting an amount of light to be emitted from each of the plurality of LED elements such that the variance is alleviated.

In a preferable embodiment, the plate-like member is pivotable about the rotation shaft located in the vicinity of a top end of the liquid crystal panel; a solar panel is located on a second surface of the plate-like member which is opposite to the first surface; a front light receiving sensor for detecting an amount of natural light incident on a front surface of the liquid crystal display device is provided on the front surface; the liquid crystal panel is a semi-transmissive liquid crystal panel in which a transmission mode of using light from the irradiation section and a reflection mode of using the natural light from the front surface are switchable to each other; the control device executes a step of switching the liquid crystal panel to the transmission mode or to the reflection mode based on the amount of light detected by the front light receiving sensor; and when the liquid crystal panel is switched to the transmission mode, the control device controls the pivoting of the plate-like member such that the first surface of the plate-like member receives the natural light from the sun; and when the liquid crystal panel is switched to the reflection mode, the control device controls the pivoting of the plate-like member such that the second surface of the plate-like member receives the natural light from the sun.

Advantageous Effects of the Invention

With the liquid crystal display device according to the present invention, the light guiding section is located on the first surface of the plate-like member attached to a part of the liquid crystal panel, and the light guiding section is connected to the irradiation section for irradiating the liquid crystal panel with light. The optical sensors each for detecting an amount of light are provided on the first surface of the plate-like member. The control device is structured to control the amount of light to be emitted from each of the plurality of LED elements by use of the LED driving section based on the amounts of light detected by the optical sensors.

Accordingly, in the case where the liquid crystal display device is used outdoors for digital signage, natural light can be collected and used as light of the irradiation section. Therefore, display of digital signage installed outdoors can be suppressed from appearing darker than the natural light. In addition, even when the amount of natural light collected by the plurality of LED elements is changed due to the environment or the like, an image can be displayed properly.

DESCRIPTION OF EMBODIMENTS

Figure 1:
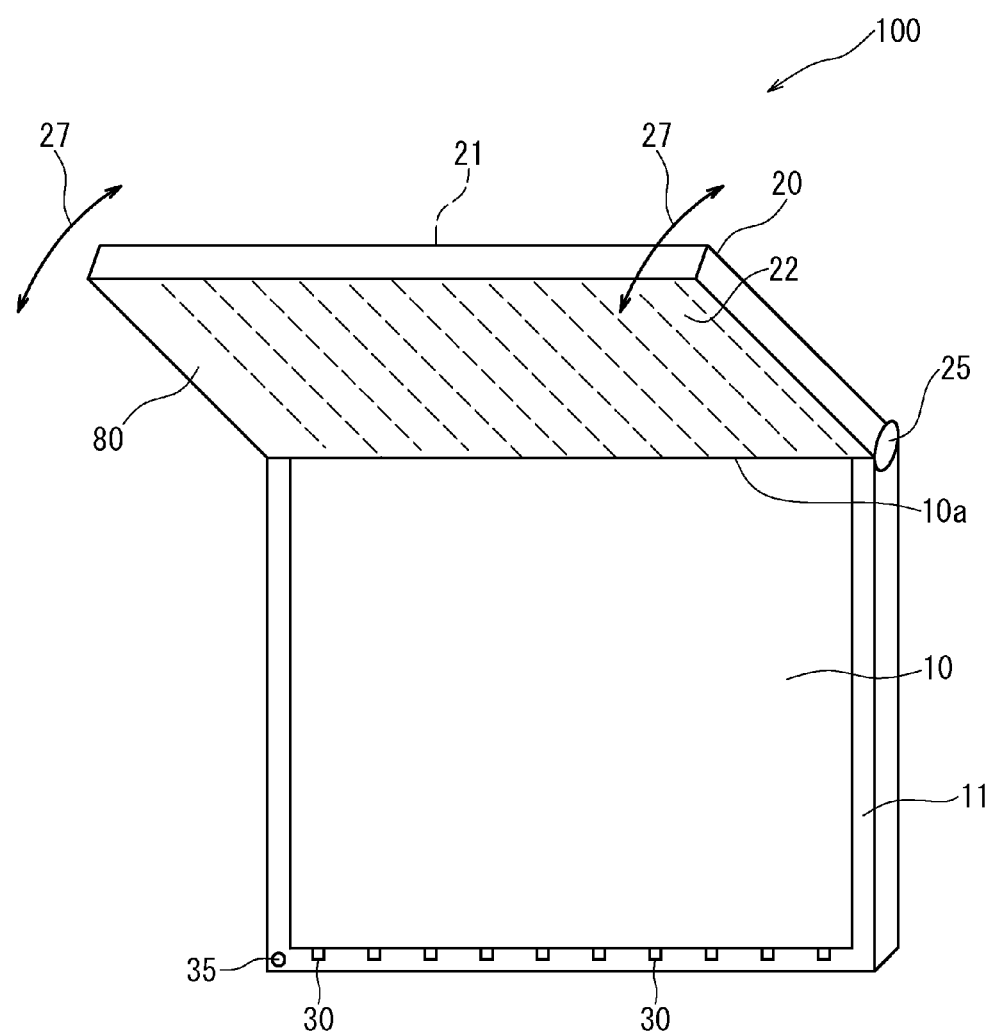
FIG. 1 is a perspective view schematically showing a structure on the front side of a liquid crystal display device 100 according to an embodiment of the present invention.

The present inventors studied using liquid crystal display devices outdoors for digital signage (electronic advertisement), and obtained the following knowledge. First, when a liquid crystal display device including a reflection type liquid crystal panel is used, there is a problem that digital signage is not displayed at night or when natural light is weak. The reflection type liquid crystal panel is inferior to a transmission type liquid crystal panel in terms of color reproducibility and contrast, and thus cannot realize image display in a superb manner, which is a feature of digital signage.

Even when the transmission type liquid crystal panel is used, display of digital signage installed outdoors may appear darker than the natural light. A reason for this is outdoor light (sunlight in the daytime of a fine day: about 100,000 lux) has illuminance about 250 times the illuminance of the light of indoor illumination (office illuminated with a fluorescent lamp: about 400 lux). However, it is not actually possible that the liquid crystal panel is provided with a backlight unit for emitting light corresponding to the outdoor light. Therefore, it is difficult to solve the problem that display of the digital signage installed outdoors appears darker than the natural light.

The present inventors obtained the knowledge that in the case where natural light such as sunlight or the like is collected and used as backlight, the problem that display of the digital signage installed outdoors appears darker than the natural light can be solved and also the power consumption can be reduced. However, in the case where the collected natural light is used as backlight, display cannot be provided at night, and also the amount of the collected natural light is changed even in the daytime due to the weather or environment and this influences the state of display. With such an influence, image display in a superb manner, which is a feature of digital signage, cannot be realized like in the case where the reflection type liquid crystal panel is used for digital signage.

The present inventors studied the above-described problems and conceived a liquid crystal display device (digital signage) which can solve the problems. Thus, the present invention has been made.

Hereinafter, embodiments of the present invention will be described with reference to the drawings. In the drawings referred to below, elements having substantially identical functions will bear identical reference signs for the simplicity of explanation. The present invention is not limited to the following embodiments.

Figure 2:
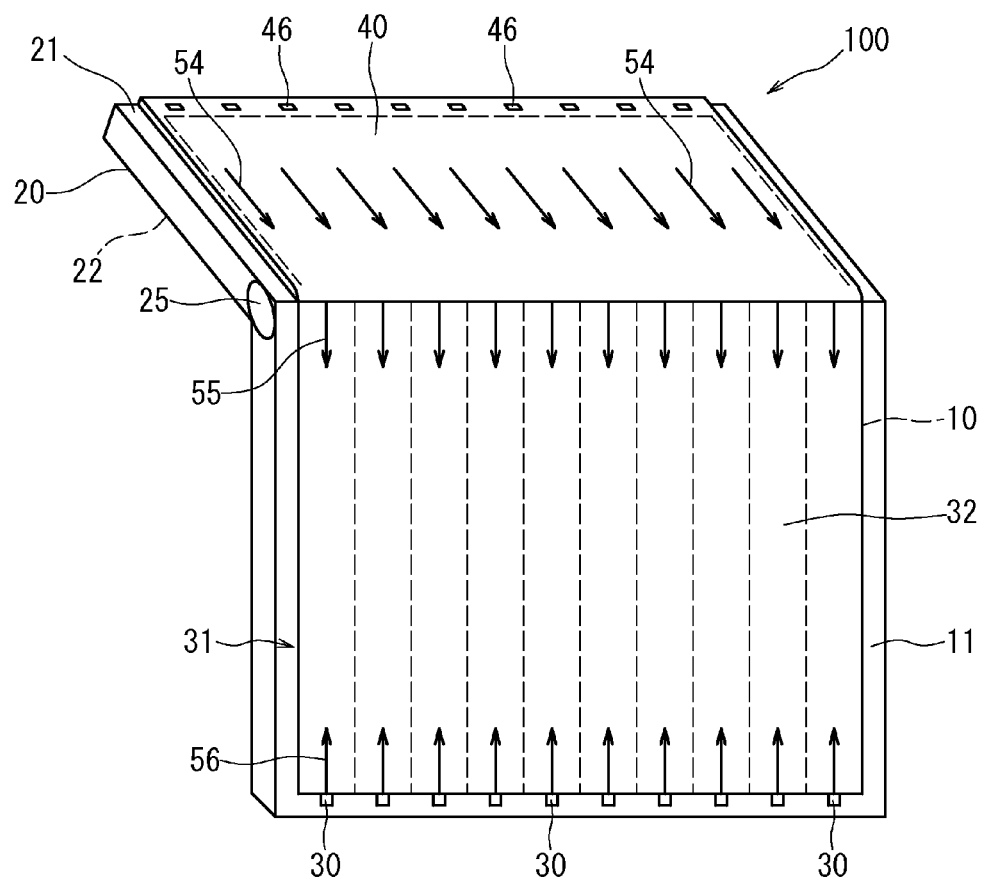
FIG. 2 is a perspective view schematically showing a structure on the rear side of the liquid crystal display device 100 according to an embodiment of the present invention.
Figure 3:
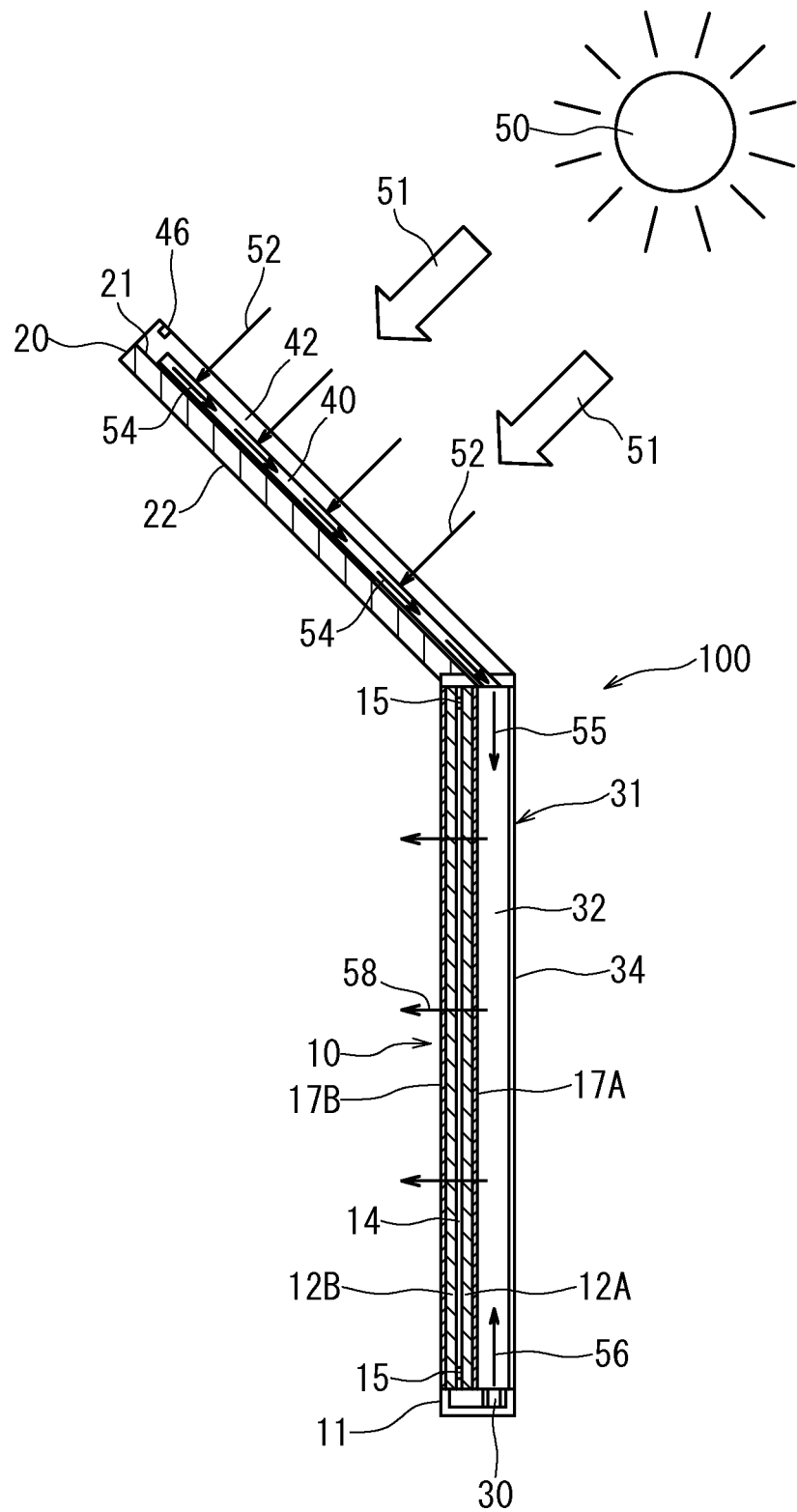
FIG. 3 schematically shows a cross-sectional structure of the liquid crystal display device 100 according to an embodiment of the present invention.

FIG. 1 is a front perspective view schematically showing a structure of a liquid crystal display device 100 according to an embodiment of the present invention. FIG. 2 and FIG. 3 are respectively a rear perspective view and a cross-sectional view schematically showing the structure of the liquid crystal display device 100 in this embodiment.

As shown in FIG. 1, the liquid crystal display device 100 in this embodiment is a liquid crystal display device capable of displaying an image, and specifically, is a display device used outdoors for digital signage. The liquid crystal display device 100 in this embodiment includes a liquid crystal panel 10, an irradiation section 31 for irradiating the liquid crystal panel 10 with light, and a control device (not shown) for controlling driving of the liquid crystal panel 10.

A plate-like member 20 is attached to a part (10a) of the liquid crystal panel 10. In this embodiment, the plate-like member 20 is attached to a top end 10a of the liquid crystal panel 10. The top end 10a of the liquid crystal panel 10 is a part which is located on the top side when the liquid crystal panel 10 is located in a vertical direction. The plate-like member 20 has a first surface 21 which is on the rear side where the liquid crystal panel 10 is considered as being on the front side, and a second surface 22 located on opposite side to the first surface 21. In other words, the second surface 22 is on the front side where the liquid crystal panel 10 is considered as being on the front side.

As shown in FIG. 2, a light guiding section 40 for collecting natural light and propagating the light is located on the first surface 21 of the plate-like member 20. The light guiding section 40 is connected to the irradiation section 31. A plurality of optical sensors 46 each for detecting an amount of light are also provided on the first surface 21 of the plate-like member 20. The irradiation section 31 includes a plurality of LED elements 30. The control device in this embodiment is connected to an LED driving section for controlling an amount of light to be emitted from each of the plurality of LED elements 30, and is also connected to the optical sensors 46. According to the structure of this embodiment, the control device is structured to control the amount of light to be emitted from each of the plurality of LED elements 30 by use of the LED driving section based on the amount of light detected by each of the optical sensors 46.

According to the structure of this embodiment, as shown in FIG. 1, the plate-like member 20 is pivotable about a rotation shaft 25 located in the vicinity of the top end of the liquid crystal panel 10 (see arrow 27). On the second surface 22 of the plate-like member 20, a solar panel 80 may be located. The plate-like member 20 can be pivoted in accordance with the orbit of the sun. In the case where the plate-like member 20 is pivoted in accordance with the orbit of the sun, it is preferable that the control device is constructed so as to realize such a program, namely, so as to be capable of causing the plate-like member 20 to make such a pivoting motion. In addition, a front light receiving sensor 35 is provided at a front surface of the liquid crystal display device 100 for detecting an amount of natural light incident on the front surface. In the example shown in the figure, the front light receiving sensor 35 is located in a frame area 11 of the liquid crystal panel 10.

As shown in FIG. 3, the light guiding section 40 for collecting natural light 51 and propagating light 54 is located on the first surface 21 of the plate-like member 20. The light guiding section 40 is formed of a transparent resin. In the example shown in the figure, a cover section 42 for protecting the light guiding section 40 is provided. The cover section 42 is formed of a light-transmissive material, for example, a transparent resin or glass. Furthermore, the light (natural light) 51 from the sun 50 is directed to the light guiding section 40 located on the first surface 21 of the plate-like member 20, and the light 52 directed to the light guiding section 40 is guided to the irradiation section 31 as represented by arrows 54. In this example, the light 54 propagated in the light guiding section 40 is guided to a light guiding plate 32 in the irradiation section 31. The light guiding section 40 and the light guiding plate 32 may be formed as a continuous, integral member.

The optical sensors 46 in this embodiment are located along a top end of the plate-like member 20, specifically, between a top end of the light guiding section 40 and the top end of the plate-like member 20. In this example, the optical sensors 46 are arranged in one line at an equal interval from left to right. The optical sensors 46 can measure the amount of the light 52 directed to the light guiding section 40. Specifically, the optical sensors 46 can measure the amount of the light 52 directed to the light guiding section 40 at positions thereof from a left end to a right end. The optical sensors 46 are each formed of a photoelectric conversion element and can convert the light directed thereto into an electrical signal. The photoelectric conversion element forming each optical sensor 46 has, for example, a structure in which an amorphous silicon layer and a microcrystalline silicon layer which are stacked on each other. The manner of arranging the optical sensors 46 is not limited to that shown in FIG. 2, and the optical sensors 46 may be arranged in any manner preferable for the form of use.

The irradiation section 31 in this embodiment is an edge-light type backlight unit. As shown in FIG. 3, the irradiation section 31 in this embodiment includes the light guiding plate 32 located on a rear surface of the liquid crystal panel 10 and a reflective film 34 located on a rear surface of the light guiding plate 32. Instead of forming the reflective film 34 on the rear surface of the light guiding plate 32, the rear surface of the light guiding plate 32 may be made a diffusing plane. An end (e.g., top end) of the light guiding plate 32 is connected to the light guiding section 40 located on the plate-like member 20. An end (e.g., bottom end) of the light guiding plate 32 is connected to the LED elements 30. The light 54 propagated in the light guiding section 40 becomes light 55 when entering the light guiding plate 32. The light 55 becomes irradiation light 58 for irradiating the liquid crystal panel 10 together with light 56 emitted from the LED elements 30 to the light guiding plate 32.

The liquid crystal panel 10 in this embodiment has a generally rectangular overall shape, and includes a pair of light-transmissive substrates (glass substrates) 12A and 12B. The substrates 12A and 12B are located to face each other, and a liquid crystal layer 14 is provided between the substrates 12A and 12B. The liquid crystal layer 14 is formed of a liquid crystal material having an optical characteristic which changes when an electric field is applied between the substrates 12A and 12B. The substrates 12A and 12B are provided with a sealing member 15 along an outer edge thereof for sealing the liquid crystal layer 14. On outer surfaces of the substrates 12A and 12B, polarizing plates 17A and 17B are respectively bonded. In this embodiment, among the substrates 12A and 12B, the substrate located on the rear side is an array substrate 12A, and the substrate located on the front side is a color filter substrate (CF substrate) 12B.

The irradiation light 58 from the light guiding plate 32 in the irradiation section 31 passes the polarizing plate 17A, the array substrate 12A, the liquid crystal layer 14, the CF substrate 12B and the polarizing plate 17B, and thus an image is displayed. Between the light guiding plate 32 and the liquid crystal panel 10, a light diffuser film (not shown) can be provided. In the case where the light diffuser film is provided, the light which has passed the light diffuser film is more diffused, and therefore the irradiation section 31 acts as a planar light source for emitting light more uniformly. In FIG. 2, phantom lines (dashed lines) are shown in the light guiding plate 32 so that the correspondence between portions of the light guiding plate 32 and the LED elements 30 is better understood. It should be noted that preferable positional relationship and correspondence between the light guiding plate 32 and the LED elements 30 are adopted appropriately in accordance with the actual optical design of the irradiation section 31. The number of, or the manner of arrangement of, the LED elements 30 is not limited to that shown here, and may be appropriately changed to a preferable number or manner of arrangement. In addition, FIG. 1 and FIG. 2 show the LED elements 30 in a clearly visible manner for the purpose of explanation, but in this example, the LED elements 30 are located on an end surface of the light guiding plate 32 in the frame area 11 as shown in FIG. 3. The light 54, light 55, light 56 and the like are represented with arrows of predetermined directions for easier understanding, but there are also optical components proceeding in other directions.

Figure 4:
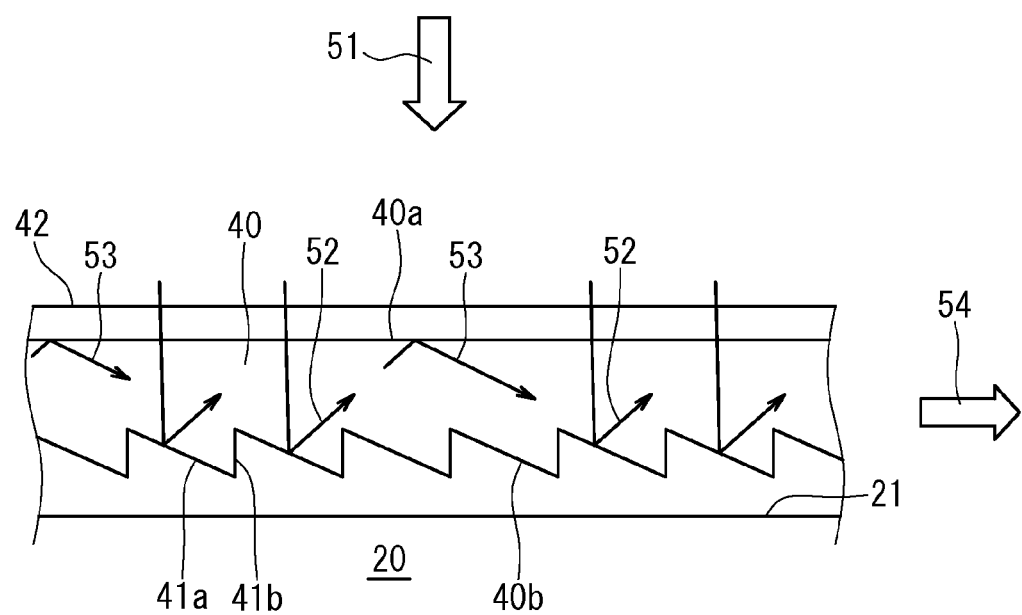
FIG. 4 is an enlarged view provided for explaining a cross-sectional structure of a light guiding section 40.

FIG. 4 is an enlarged view showing a cross-section of the light guiding section 40 in this embodiment. In this embodiment, a bottom surface 40b of the light guiding section 40 has a sawtooth-like cross-section so that the light propagated in the light guiding section 40 proceeds in the direction of arrow 54 as a whole. The bottom surface 40b of the light guiding section 40 includes a plurality of inclining faces 41a for causing the light 52 reflected by the bottom surface 40b of the light guiding section 40 to proceed in the direction of arrow 54, and vertical faces (or generally vertical faces) 41b for forming the inclining faces 41a. A part (53) of the light proceeding in the light guiding section 40 is reflected by a top surface 40a of the light guiding section 40 and proceeds in the direction of arrow 54. The light (54) propagated in the light guiding section 40 reaches the light guiding plate 32 in the irradiation section 31.

Figure 5:
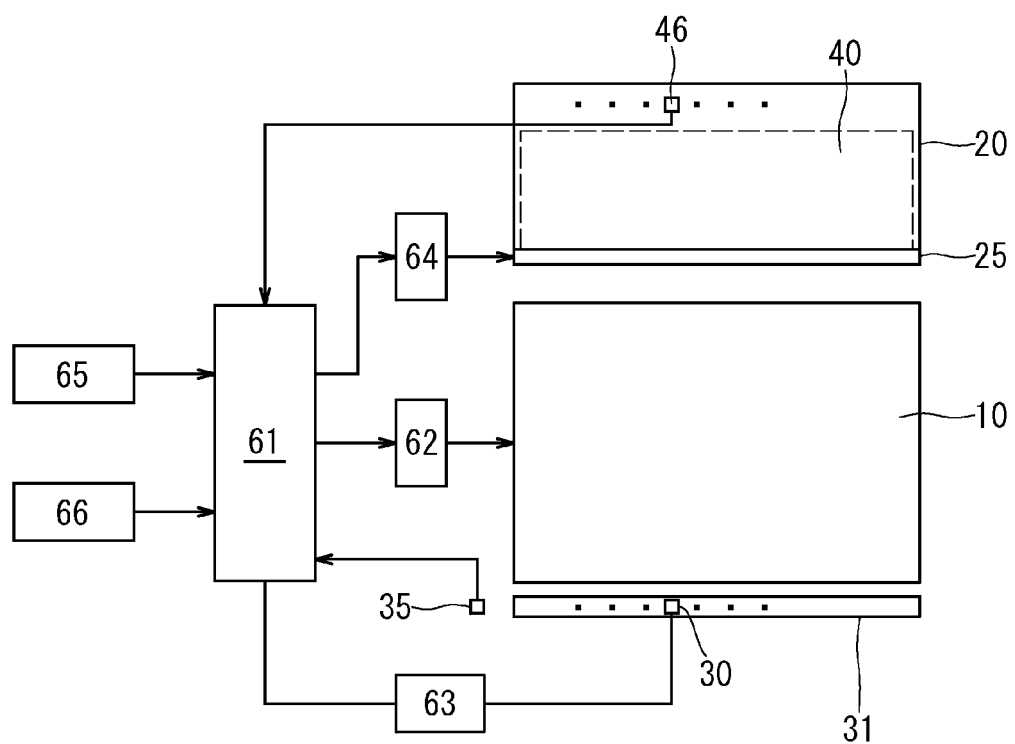
FIG. 5 is a block diagram provided for explaining the structure of the liquid crystal display device 100.

FIG. 5 is a block diagram showing the structure of the liquid crystal display device 100 in this embodiment. The liquid crystal display device 100 in this embodiment includes the liquid crystal panel 10, the irradiation section 31 for the liquid crystal panel 10, the light guiding section 40, and a control device 61 for controlling the driving of the liquid crystal panel. The control device 61 includes a semiconductor integrated circuit, and is, for example, an MPU (microprocessor unit). The control device 61 may include a storage device (semiconductor memory, hard disc, optical disc, etc.). Various programs, various data, calculation results or the like can be stored on the storage device.

The control device 61 controls a liquid crystal panel driving section 62 to cause the liquid crystal panel 10 to provide display. The liquid crystal panel driving section 62 is a section for driving the liquid crystal panel 10 to cause the liquid crystal panel 10 to display an image. The liquid crystal panel driving section 62 drives the liquid crystal panel 10 based on a signal input from the control device 61. Specifically, the liquid crystal panel driving section 62 corresponds to a driver circuit including a gate driver, a source driver and the like. The liquid crystal panel driving section 62 can cause the liquid crystal panel 10 to display an image on the entirety of a display screen thereof, or can cause the liquid crystal panel 10 to display an image on only a part (e.g., central part) of the display screen thereof based on a signal from the control device 61.

The control device 61 is connected to an LED driving section (e.g., LED driver circuit) 63 for controlling an amount of light to be emitted from each of the plurality of LED elements 30. The plurality of LED elements 30 are located so as to emit light to the light guiding plate included in the irradiation section 31, and are, for example. white LEDs. The white LED forming each LED element 30 is a combination of a blue LED and a phosphor, but may be any other LED (combination of a purple LED and a phosphor, or the like). The LED elements 30 are shown as a typical example of point light source for emitting light that can be dimmed, which is used to provide display with the light emitting intensity being different area by area in the liquid crystal panel 10. The LED driving section 63 is a section for turning on or off, or for changing the light emitting intensity of, each LED element 30 independently. The LED driving section 63 can drive each LED element 30 independently based on a signal input from the control device 61. Specifically, the LED driving section 63 includes a driver circuit which includes, for example, a switch and the like.

With the structure of this embodiment, the control device 61 is connected to a movable section 64 for pivoting the plate-like member 20. The movable section 64 is coupled to the rotation shaft 25 of the plate-like member 20, and can pivot the plate-like member 20 based on a signal input from the control device 61. The movable section 64 is, for example, a motor capable of pivoting the plate-like member 20.

In addition, the control device 61 is connected to an external system 65 and to an external power supply 66. The external system 65 is a device for inputting image information to the control device 61. The external system 65 is, for example, a stand-alone personal computer (PC), a PC connected to a network server for accumulating image information, or the like. The external power supply 66 is a power source for supplying power to the liquid crystal display device 100 in this embodiment, and is, for example, a commercial power supply.

With the structure of this embodiment, the optical sensors 46 provided on the plate-like member 20 are connected to the control device 61. The control device 61 acquires data on the amounts of light detected by the optical sensors 46 which respectively correspond to portions of the light guiding section 40. The control device 61 is connected to the front light receiving sensor 35. Therefore, the control device 61 can also acquire data on the amount of light detected by the front light receiving sensor 35 (i.e., amount of natural light incident on the front surface).

In the example of structure shown here, the control device 61, the liquid crystal panel driving section 62, the LED driving section 63 and the movable section 64 are shown as separate members. Alternatively, a part of, or all of, these elements may be constructed as one semiconductor integrated circuit. As a parameter of light detected by the optical sensors 46 or a parameter of light processed by the control device 61 (or the LED driving section 63), any parameter which can be handled by the irradiation section (backlight unit) 31 is usable. Therefore, in this sense, numerical data representing the amount of light, or any other optical parameter such as the luminous flux, luminous intensity, luminance or the like, is usable.

Figure 6:
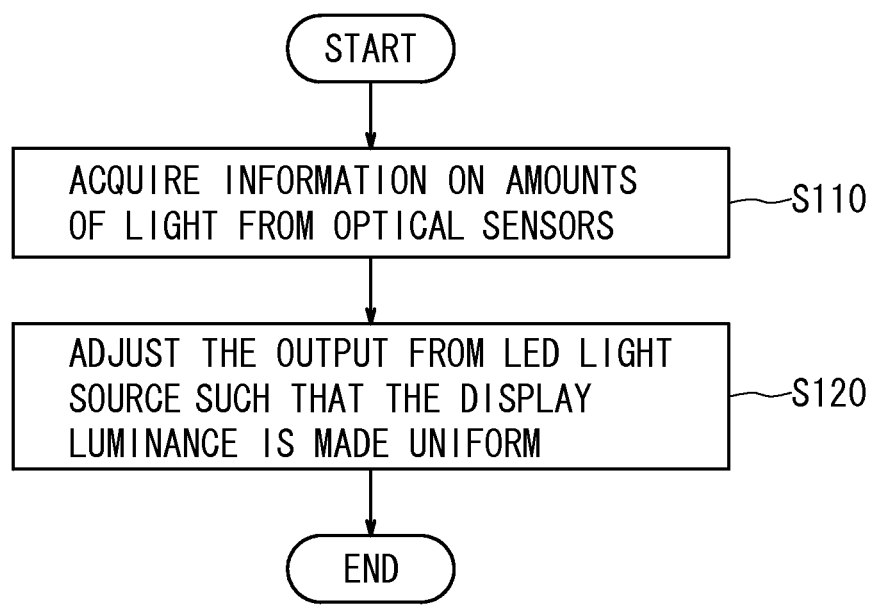
FIG. 6 is a flowchart provided for explaining a method for controlling the liquid crystal display device 100.

Now, an operation of the liquid crystal display device 100 in this embodiment will be described. FIG. 6 is a flowchart showing a method for controlling the liquid crystal display device 100 in this embodiment.

The liquid crystal display device 100 in this embodiment is operated as follows. First, information on the amounts of light is acquired from the optical sensors 46 (step S110). In this step, the information on the amount of light detected by each of the plurality of optical sensors 46 is input to the control device 61. Next, the outputs of the LED elements (LED light source) 30 are adjusted such that the display luminance of the liquid crystal panel 10 is made uniform (step S120). In this step, the control device 61 controls the LED driving section 63 based on the information from the optical sensors 46 to dim the light from the LED elements 30 and thus to uniformize the display luminance of the liquid crystal panel 10.

Figure 7:
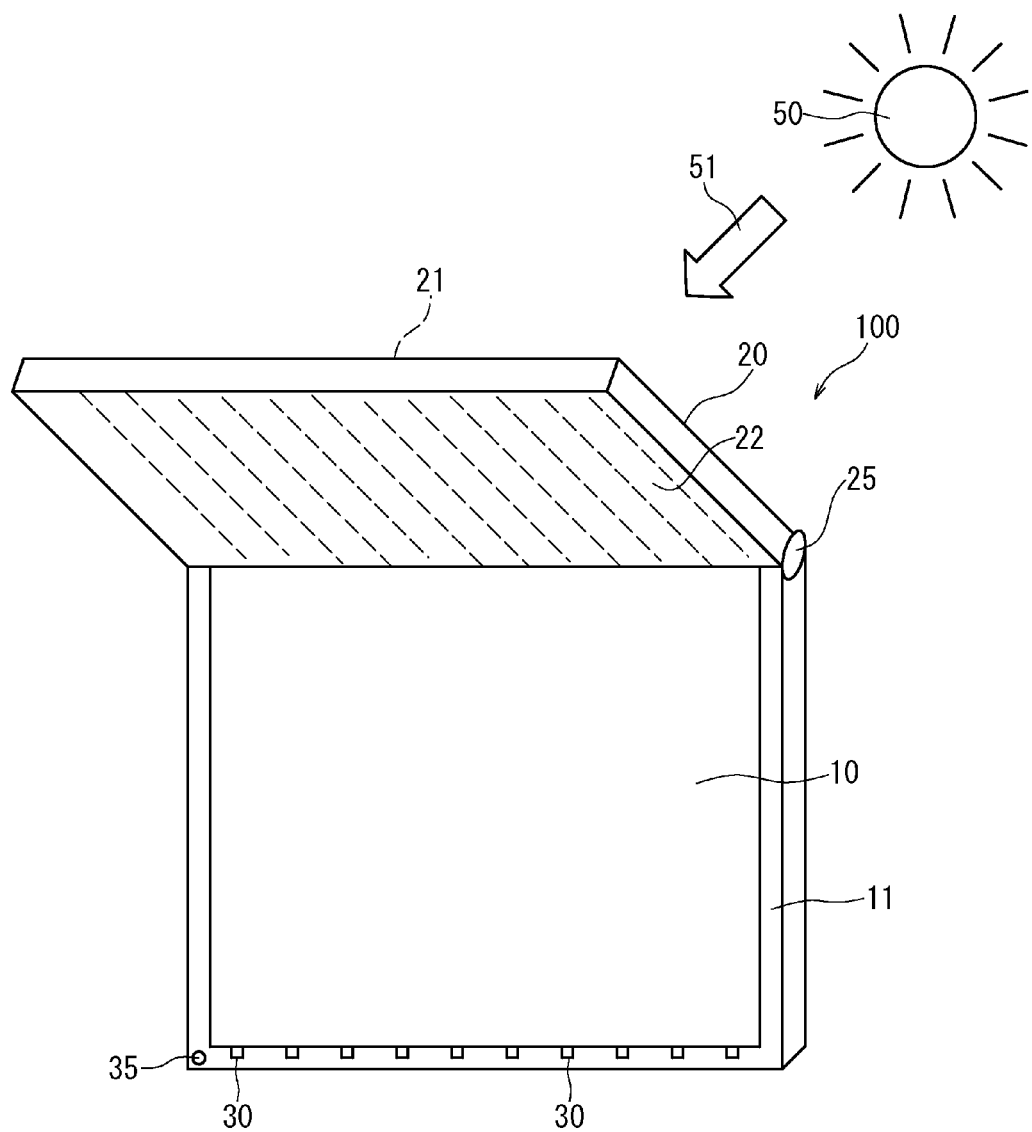
FIG. 7 is a perspective view schematically showing the structure on the front side of the liquid crystal display device 100 in the state of being irradiated with natural light 51.
Figure 8:
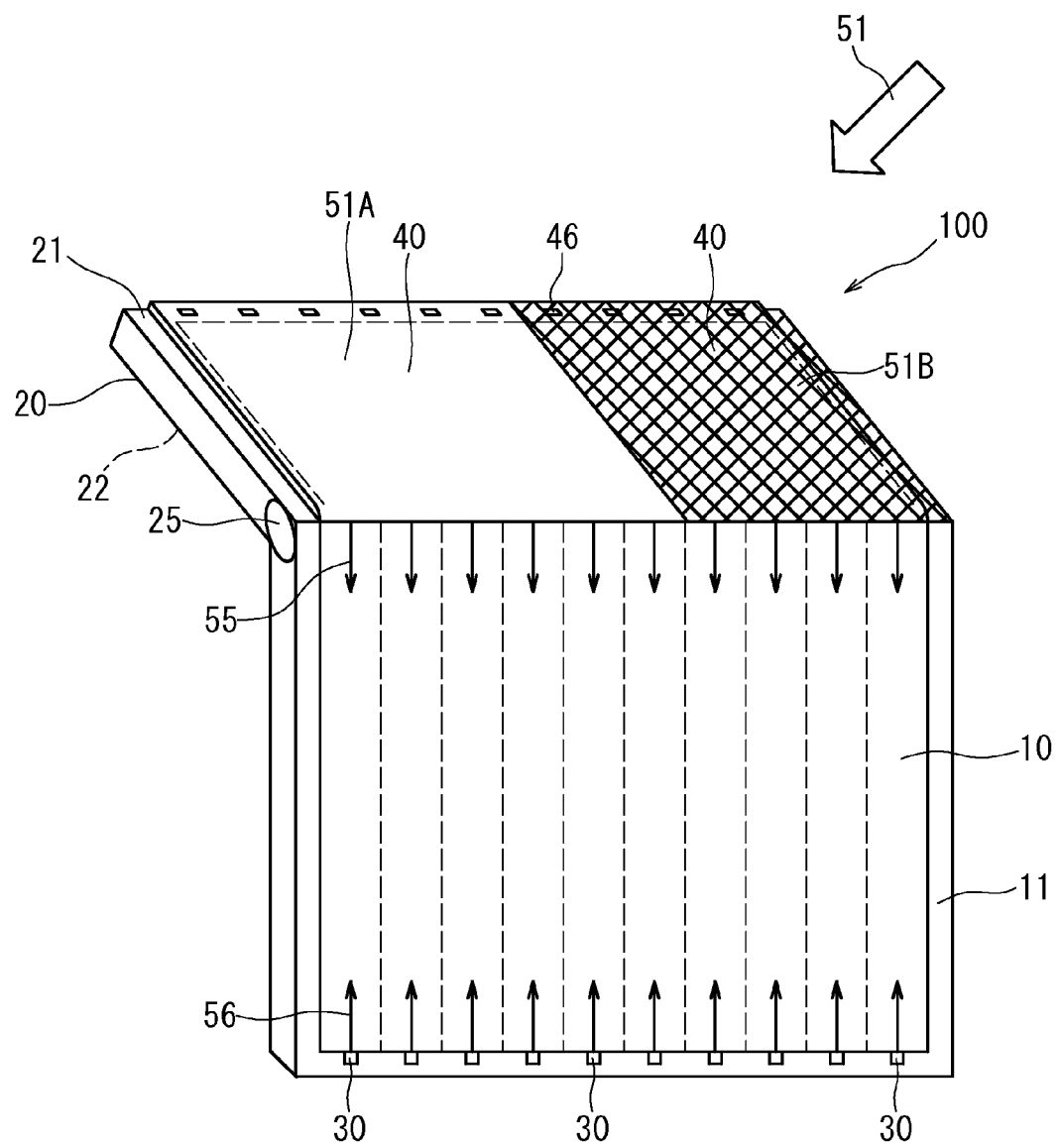
FIG. 8 is a perspective view schematically showing the structure on the rear side of the liquid crystal display device 100 in the state of being irradiated with the natural light 51.
Figure 9:
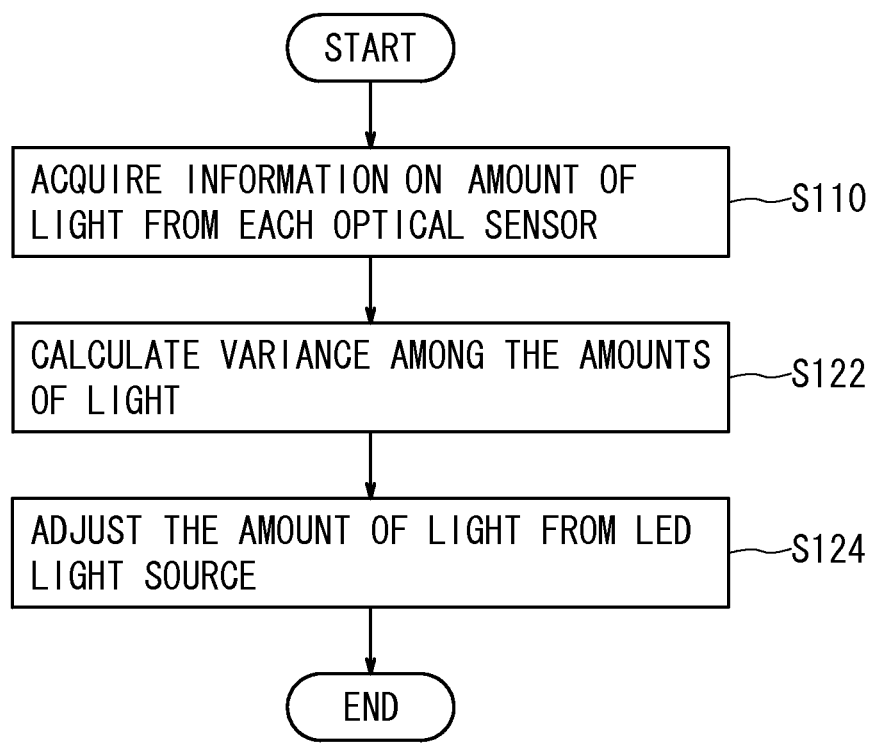
FIG. 9 is a flowchart provided for explaining a method for controlling the liquid crystal display device 100.

Now, with reference to FIG. 7 through FIG. 9, the operation of the liquid crystal display device 100 will be further described. FIG. 7 and FIG. 8 are perspective views schematically showing the structure of the liquid crystal display device 100. FIG. 7 and FIG. 8 respectively correspond to FIG. 1 and FIG. 2. FIG. 9 is a flowchart showing the method for controlling in this embodiment.

First, as shown in FIG. 7, it is assumed that the liquid crystal display device 100 in this embodiment is used outdoors for digital signage and that the light (natural light) 51 from the sun 50 is directed to the first surface 21 of the plate-like member 20. Since the liquid crystal display device 100 is installed outdoors, the natural light 51 does not necessarily irradiate the entirety of the first surface 21 of the plate-like member 20 uniformly.

For example, there is a case where, as shown in FIG. 8, a part of a right area of the first surface 21 of the plate-like member 20 is shadowed as a shadowed area (51B) and the rest of the first surface 21 is bright as a bright area (51A). The amount of light collected by the light guiding section 40 in the shadowed area (51B) and the amount of light collected by the light guiding section 40 in the non-shadowed area (51A) are different from each other. With the liquid crystal display device 100 in this embodiment, the light collected and propagated by the light guiding section 40 is used as backlight. Therefore, the area-by-area variance of the amount of light collected by the light guiding section 40 leads to variance of the luminance of the liquid crystal panel 10. A reason for the shadow may be the existence of a tree, an electric light pole, a building or the like. Even if there is no shadow at one point in time, a shadow may be made at another point in time as a result of the position of the sun being changed.

The liquid crystal display device 100 in this embodiment is operated as follows. As shown in FIG. 9, the information on the amounts of light detected by the optical sensors 46 is acquired (step S110). Next, the variance among the amounts of light is calculated (step S122). In this step, the control device 61 calculates the variance among the amounts of light detected by the optical sensors 46. The control device 61 controls the LED driving section 63 to adjust the light emitting intensity of the light to be emitted from each LED element 30, such that the variance among the amounts of light is alleviated (step S124). In the example shown in FIG. 8, the light emitting intensity of the LED elements 30 for emitting light to portions corresponding to the shadowed area (51B) is made high, whereas the light emitting intensity of the LED elements 30 for emitting light to portions corresponding to the bright area (51A) is made lower.

Specifically, based on the information on the amount of light detected by each of the optical sensors 46, the control device 61 calculates the amount (or intensity) of the light 55 to be emitted by a portion of the light guiding section 40 corresponding to said each of the optical sensors 46. The control device 61 calculates the amount of the light 56 to be emitted by each LED element 30 such that the variance of the light 55 to be emitted from the end surface of the light guiding section 40 calculated by the control device 61 is alleviated (such that the light 55 is made as uniform as possible). Thus, the control device 61 determines the light emitting intensity of each LED element 30. The calculation for determining the light emitting intensity of each LED element 30 is performed based on the size of the irradiation section 31 and a parameter of a characteristic (degree of diffusion, refractive index, etc.) of an optical member (e.g., light guiding plate) included in the irradiation section 31, such that the variance of the light 55 from the light guiding section 40 is alleviated. Thus, the light emitting intensity of each LED element 30 is determined.

Such processing for alleviating the variance is not necessarily performed by a control circuit included in the control device 61 itself. For example, a program stored on the storage device connected to the control device 61 (e.g., data processing program for the optical sensors 46, program for determining the light emitting intensity of the LED elements 30, etc.) may be started and the light emitting intensity may be determined by the control device 61 based on the program. In the case where the light guiding section 40 and the irradiation section 31 are structured by the optical members in a particular manner, the processing of determining the light emitting intensity of each LED element 30 may be used together with the processing of decreasing the light emitting intensity of the light 55 to be emitted from the end surface of the light guiding section 40, so that the variance is alleviated. The processing of alleviating the variance encompasses processing of uniformizing the light emitting luminance over the entirety of the liquid crystal panel 10, and also processing of, for example, making the light emitting luminance of a center area of the liquid crystal panel 10 relatively high and making the light emitting luminance of a peripheral area of the liquid crystal panel 10 slightly lower.

The liquid crystal display device 100 in this embodiment includes the front light receiving sensor 35, and the front light receiving sensor 35 is connected to the control device 61. Therefore, the intensity of the light 58 for irradiating the liquid crystal panel 10 can be determined based on information on the brightness of the natural light detected by the front light receiving sensor 35. It is preferable that a reflection-preventive film is located on the front surface of the liquid crystal panel 10 in order to suppress reflection.

In addition, with the structure in this embodiment, the natural light 51 is collected by the light guiding section 40 and is used as the irradiation light 58 of the irradiation section 31. Therefore, it is preferable that the CF substrate 12B in the liquid crystal panel 10 includes color filters corresponding to the spectrum of the sunlight. It is also preferable that the LED elements 30 included in the irradiation section 31 emit light having a spectrum in consideration of the spectrum of the sunlight. By forming the color filters and the LED elements 30 in a form corresponding to the spectrum of the sunlight in this manner, the difference between the spectrum of the edge light and the spectrum of the sunlight can be alleviated so that the display does not cause any unnaturalness.

The control device 61 is connected to the movable section 64 for pivoting the plate-like member 20, and therefore can pivot the plate-like member 20 in accordance with the orbit of the sun 50. Owing to this, the plate-like member 20 can be located at a position where the natural light 51 can be collected by the light guiding section 40 efficiently. For example, when the sun 50 is located on the right in FIG. 3, the plate-like member 20 is inclined leftward with respect to the vertical direction (e.g., at an angle of 15° to 45° to the left of the vertical direction). By contrast, when the sun 50 is located on the left in FIG. 3, the plate-like member 20 may be, for example, extended horizontally (i.e., at an angle of 90° with respect to the vertical direction), so that the natural light 51 can be collected by the light guiding section 40. Such pivoting motion of the plate-like member 20 in accordance with the orbit of the sun 50 may be controlled by the control device 61 based on a program (program of tracking the orbit of the sun 50) stored on the storage device connected to the control device 61.

In the liquid crystal display device 100 in this embodiment, a semi-transmissive liquid crystal panel in which a transmission mode and a reflection mode are switched to each other can be used as the liquid crystal panel 10. In the semi-transmissive liquid crystal panel, the transmission mode of using the light 58 from the irradiation section 31, and the reflection mode of using the natural light from the front surface, can be switched to each other. Such a semi-transmissive liquid crystal panel is disclosed in, for example, Japanese Patent Laid-Open Publication No. 2007-219172. Specifically, between the liquid crystal panel (main liquid crystal panel) 10 and the irradiation section (backlight) 31, a switch liquid crystal panel for switching the polarization state of the transmitted light in accordance with the driving voltage is located. A reflective polarizing plate is located between the switch liquid crystal panel and the irradiation section 31. The display mode is switched to the reflection mode or to the transmission mode by turning on or off the irradiation section 31 and also by switching the driving voltage of the switch liquid crystal panel. Thus, the semi-transmissive liquid crystal panel can be realized.

In the case where the semi-transmissive liquid crystal panel is used as the liquid crystal panel 10, when the intensity of the natural light from the front surface is high, the liquid crystal panel 10 can be used in the reflection mode. Specifically, the control device 61 switches the semi-transmissive liquid crystal panel 10 to the reflection mode from the transmission mode based on the amount of light detected by the front light receiving sensor 35 (e.g. when the amount of light is equal to or higher than a predetermined value). When the sun 50 is located on the front side, the reflection mode is suitable. In this case, the transmission mode is not suitable for the following reason. Even if the plate-like member 20 is pivoted to be parallel (or generally parallel) to the ground, the amount of light collected by the light guiding section 40 is small. When the intensity of the natural light from the front surface of the liquid crystal panel 10 is high, the display appears dark unless the display luminance of the liquid crystal panel 10 is made high. Therefore, even if the amount of light collected by the light guiding section 40 is small, it is preferable that the amount of the light 58 from the irradiation section 31 is made large. For the above reason, the power consumption of the LED elements 30 is likely to be increased. Therefore, in the case where the semi-transmissive liquid crystal panel 10 is used, when the intensity of the light from the front surface thereof is high, it is preferable that the liquid crystal panel 10 is used in the reflection mode.

By contrast, when the intensity of the light from the front surface is low and especially the sun 50 is located on the rear side of the liquid crystal panel 10, the semi-transmissive liquid crystal panel 10 can be used in the transmission mode. Specifically, the control device 61 switches the semi-transmissive liquid crystal panel 10 to the transmission mode from the reflection mode based on the amount of light detected by the front light receiving sensor 35 (e.g. when the amount of light is lower than the predetermined value). When the sun 50 is located on the rear side, the transmission mode is suitable because when the plate-like member 20 is appropriately pivoted to be inclined with respect to the ground, the amount of light collected by the light guiding section 40 can be made large. For the above reason, in the case where the semi-transmissive liquid crystal panel 10 is used, when the intensity of the light from the front surface thereof is low, it is preferable that the liquid crystal panel 10 is used in the transmission mode.

In the above-described example, a semi-transmissive liquid crystal panel in which the transmission mode and the reflection mode can be switched to each other is used as the liquid crystal panel 10. Alternatively, as the liquid crystal panel 10, a semi-transmissive liquid crystal panel which can use both of the transmission mode and the reflection mode, although these modes are not switchable, is usable. Specifically, a transmission type display section (transmission electrode) is provided, and also a reflection section (reflection electrode) is provided in a part of the pixel area of the liquid crystal panel 10 which is not relevant to transmission type display. In this manner, a semi-transmissive liquid crystal panel which can use both of the transmission mode and the reflection mode is realized. Such a semi-transmissive liquid crystal panel can provide a transmittance and an image quality close to those of the transmission type liquid crystal panel and also realize a high visibility under natural light.

As described above, with the liquid crystal display device 100 in this embodiment, the light guiding section 40 is located on the first surface 21 of the plate-like member 20 which is attached to the top end of the liquid crystal panel 10, and the light guiding section 40 is connected to the irradiation section 31. The plurality of optical sensors 46 are also provided on the first surface 21 of the plate-like member 20. The control device 61 is structured to control the amount of light to be emitted from each of the LED elements 30 by use of the LED driving section 63 based on the amounts of light detected by each optical sensor 46. Therefore, in the case where the liquid crystal display device 100 in this embodiment is used outdoors for digital signage, the natural light 51 can be collected and used as the light (55, 58) of the irradiation section 31. This can suppress the display of the digital signage installed outdoors from appearing darker than the natural light. In addition, the control device 61 controls the amount of light to be emitted by each LED element 30 by use of the LED driving section 63 based on the amounts of light detected by the optical sensors 46. Therefore, even if the amount of the collected light is changed (see areas 51A and 51B shown in FIG. 8) due to the environment or the like, the light 58 directed to the liquid crystal panel 10 can be made uniform. As a result, the image can be displayed properly.

With the structure of this embodiment, the light collected by the light guiding section 40 is used as the irradiation light of the irradiation section 31 for the liquid crystal panel 10.

Therefore, light (natural light) conspicuously more intense than light for indoor illumination can be used. Therefore, display of the outdoor digital signage is prevented or alleviated from appearing darker than the natural light, and also low power consumption of the backlight (irradiation section 31) can be realized. Especially in the case where the light guiding section 40 is not existent, it is desirable that the light from the backlight unit is made intense to the extent that the light does not appear darker than the natural light. This increases the power consumption of the backlight unit. By contrast, with the structure of this embodiment, use of the natural light 51 collected by the light guiding section 40 can suppress such an increase of the power consumption of the backlight unit. In addition, the light 56 from the LED elements 30 in the irradiation section 31 is emitted after being adjusted such that the variance of the amount of the light 55 to be emitted from the end surface of the light guiding section 40 is alleviated. Therefore, the power consumption can be decreased as compared with the case where the light guiding section 40 is not existent. Especially in the case where the liquid crystal panel 10 includes a large screen (e.g., having a size of 60 inches or larger), the power consumption is high and thus the running cost is high. With the structure of this embodiment, however, the power consumption can be conspicuously decreased as compared with the case where the light guiding section 40 is not existent.

Figure 10:
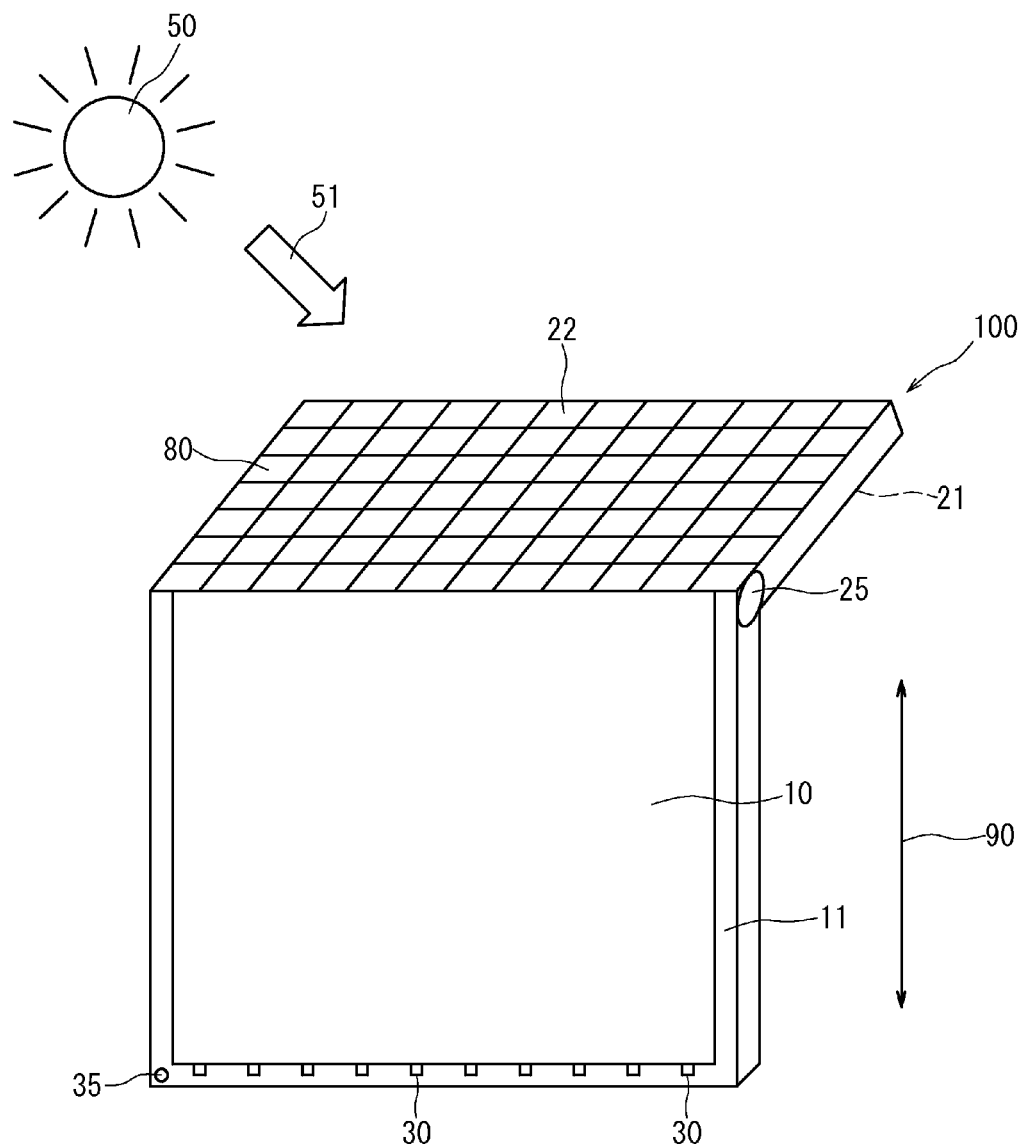
FIG. 10 is a perspective view schematically showing the structure on the front side of the liquid crystal display device 100 in the state of being irradiated with the natural light 51.

In the case where the liquid crystal display device 100 in this embodiment includes a semi-transmissive liquid crystal panel as the liquid crystal panel 10, the plate-like member 20 can be controlled as follows. When, as shown in FIG. 10, the sun 50 is located on the front side of the liquid crystal panel 10 and the intensity of the natural light 51 from the front surface is high, the liquid crystal panel 10 can be used in the reflection mode as described above. When the liquid crystal panel 10 is used in the reflection mode, the light guiding section 40 provided on the first surface 21 of the plate-like member 20 does not need to be used. Therefore, it is preferable that the solar panel 80 is provided on the second surface 22 of the plate-like member 20 and that the control device 61 controls the position of the plate-like member 20 such that the solar panel 80 receives the natural light 51 (in the example shown here, such that the second surface 22 is inclined with respect to the vertical direction 90). Needless to say, the electricity generated by the solar panel 80 can be used as the power for driving the liquid crystal display device 100.

With the structure of this embodiment, in a state where the liquid crystal panel 10 is located in the vertical direction 90, the plate-like member 20 (in other words, the first surface 21 or the second surface 22 of the plate-like member 20) can be inclined with respect to the vertical direction 90 as shown in FIG. 1 or FIG. 10. Specifically, in the case where the plate-like member 20 is movable, the plate-like member 20 is made fixable at a position between the vertical direction 90 and the horizontal direction. Alternatively, in the case where the plate-like member 20 is fixed, the plate-like member 20 is fixed at a position between the vertical direction 90 and the horizontal direction. For example, when the intensity of the natural light from the front surface is high and the liquid crystal panel 10 is used in the reflection mode, the plate-like member 20 is located to be inclined as shown in FIG. 1. Owing to this, a shadow of the plate-like member 20 is unlikely to be generated by the natural light 51 in a top area of the liquid crystal panel 10.

Figure 11:
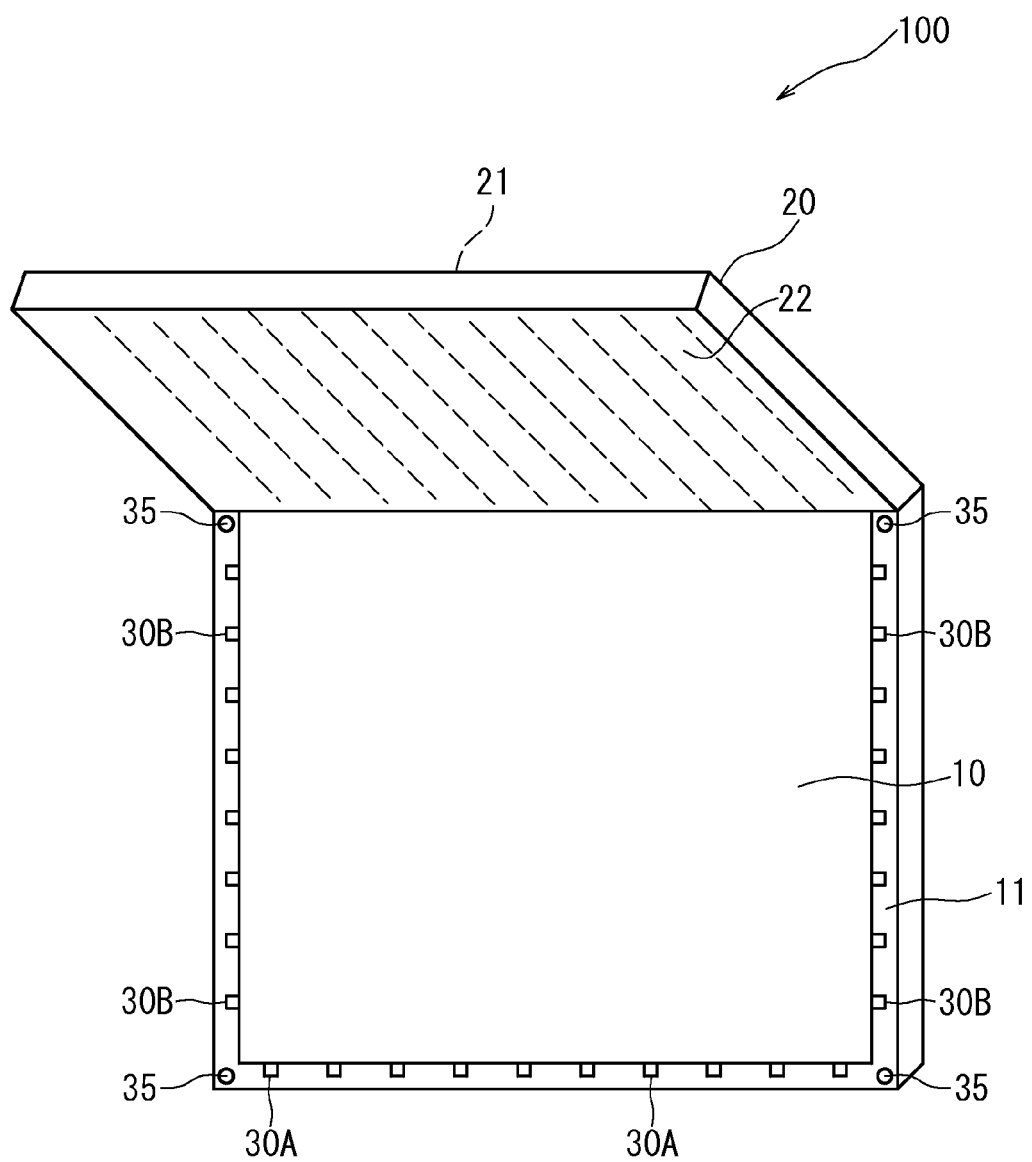
FIG. 11 is a perspective view schematically showing an example of modification of the structure on the front side of the liquid crystal display device 100.

In the above-described embodiment, the LED elements 30 are arranged along a bottom end of the irradiation section 31. The technique of arranging the LED elements 30 is not limited to this. For example, as shown in FIG. 11, LED elements 30A may be arranged along the bottom end of the irradiation section 31 and LED elements 30B may be arranged along a left end and a right end of the irradiation section 31. Alternatively, the LED elements 30A may be arranged along the bottom end of the irradiation section 31 and the LED elements 30B may be arranged along only one of the left end and the right end of the irradiation section 31. The specific specifications and manner of arrangement of the LED elements 30 are determined based on the optical design of the liquid crystal display device 100 used. Preferable specifications and manner of arrangement of the LED elements can be appropriately adopted.

In addition, in the above-described embodiment, only one front light receiving sensor 35 is provided at the front surface of the liquid crystal display device 100. Alternatively, as shown in FIG. 11, a plurality of front light receiving sensors 35 may be provided. In the case where one front light receiving sensor 35 is provided, when the area having the front light receiving sensor 35 is selectively shadowed, the intensity of the natural light received by the front light receiving sensor 35 influences the entirety of the liquid crystal panel 10. By contrast, in the case where the plurality of front light receiving sensors 35 are provided, even if the area having one of the front light receiving sensors 35 is selectively shadowed, the intensity of the natural light on the front surface of the liquid crystal panel 10 can be determined in consideration of the intensity of the natural light received by the other front light receiving sensors 35 in addition to the intensity of the natural light received by the one front light receiving sensor 35. The front light receiving sensor 35 is not limited to being provided in the frame area 11 of the liquid crystal panel 10, and may be formed in the substrate of the liquid crystal panel 10 (e.g., array substrate 12A).

In the above-described embodiment, the optical sensors 46 are located on the front surface of the light guiding section 40. The position of the optical sensors 46 is not limited to this. For example, the optical sensors 46 may be located so as to detect the amount of light in the light guiding section 40 on the plate-like member 20. As compared with the case where the optical sensors 46 are located on the front surface of the light guiding section 40, in the case where the optical sensors 46 are located so as to detect the amount of light propagated in the light guiding section 40, the amount of the light 55 to be emitted to the light guiding plate 32 in the irradiation section 31 can be easily estimated.

Figure 12:
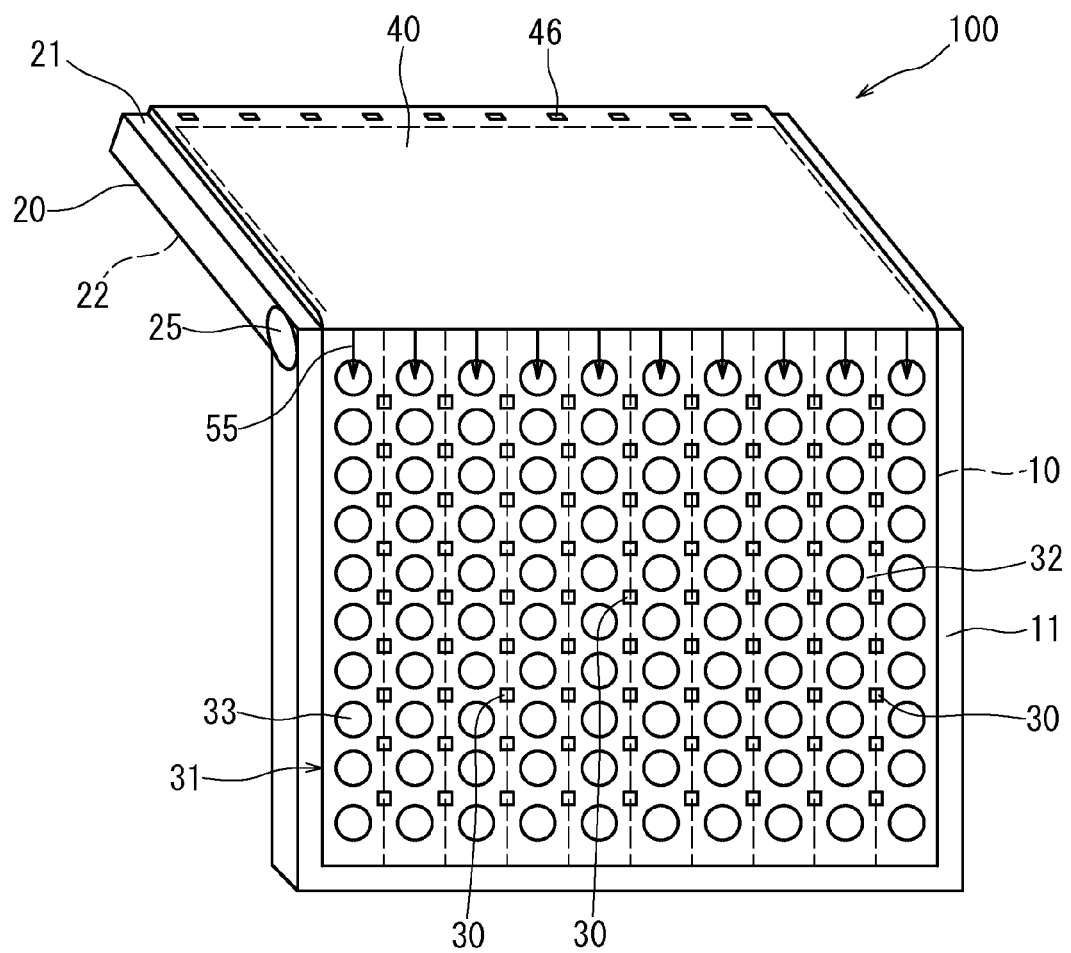
FIG. 12 is a perspective view schematically showing an example of modification of the structure on the rear side of the liquid crystal display device 100.

In the above-described embodiment, the LED elements 30 are located along the end of the irradiation section 31. The position of the LED elements 30 is not limited to this. For example, as shown in FIG. 12, the LED elements 30 may be located on the rear surface of the light guiding plate 32. In the example shown in FIG. 12, reflection patterns (or diffusion patterns) 33 are formed in the light guiding plate 32. The reflection patterns 33 and the LED elements 30 are arranged in a matrix as seen from the rear surface. In this example, the LED elements 30 are located between the reflection patterns 32. In the case where the LED elements 30 are arranged in a matrix, area-by-area control of the liquid crystal panel 10 is made easier. Even in the case where the LED elements 30 are arranged in a matrix in this manner, the control device 61 can adjust the amount of light to be emitted from each LED element 30 such that the variance among the amounts of light detected by the optical sensors 46 is alleviated.

Figure 13:
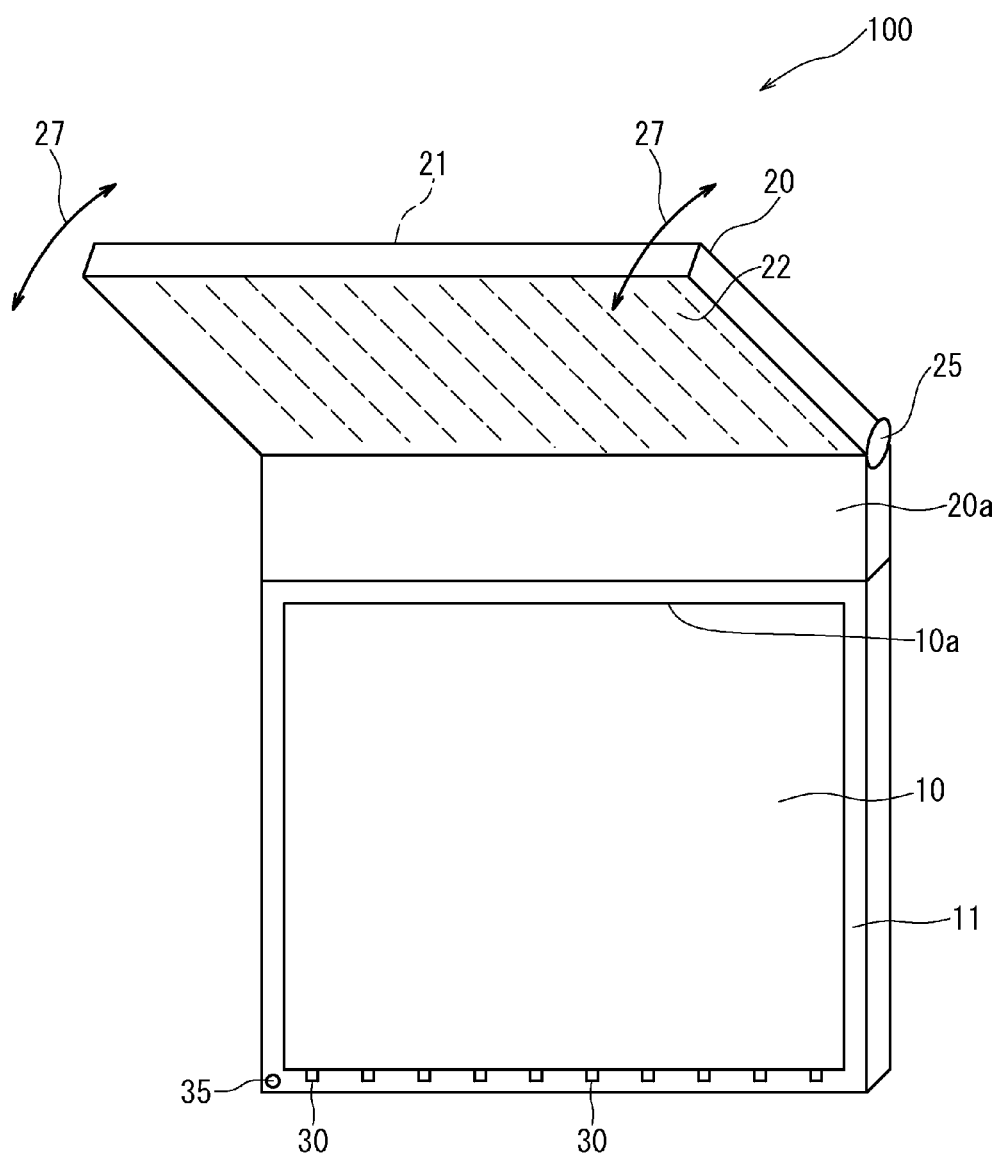
FIG. 13 is a perspective view schematically showing an example of modification of the structure on the front side of the liquid crystal display device 100.

In the above-described embodiment, the plate-like member 20 is attached to the top end of the liquid crystal panel 10. The position of the plate-like member 20 is not limited to this. The plate-like member 20 may be of a structure as shown in FIG. 13. In the liquid crystal display device 100 shown in FIG. 13, the plate-like member 20 includes an extended portion 20a, and the extended portion 20a is attached to the top end 10a of the liquid crystal panel 10. In the example shown in FIG. 13, the rotation shaft 25 is provided along a top end of the extended portion 20a, and the plate-like member (main portion) 20 having the first surface 21 and the second surface 22 is connected to the rotation shaft 25.

As shown in FIG. 1, the plate-like member 20 is not limited to being attached to the top end 10a of the liquid crystal panel 10. As long as the strength of the plate-like member 20 is maintained, the plate-like member 20 may be attached to a portion of the liquid crystal panel 10 other than the top end 10a. For example, a support member for supporting the plate-like member 20 may be provided in a top portion of left and right side surfaces of the liquid crystal panel 10 when the liquid crystal panel 10 is located in a vertically direction, and the plate-like member 20 may be supported by the support member. In this case, the plate-like member 20 can be located so as not to be attached to the top end 10a.

So far, the present invention has been described by way of preferable embodiments. The above description does not limit the present invention, and the present invention can be modified in various manners, needless to say. For example, in the above-described embodiment, one liquid crystal panel 10 is used to form an image display section. Alternatively, a plurality of liquid crystal panels 10 may be used to form one image display section.

INDUSTRIAL APPLICABILITY

According to the present invention, a light-collecting type liquid crystal display device (e.g., digital signage) capable of displaying an image properly can be provided.

DESCRIPTION OF REFERENCE SIGNS

10 Liquid crystal panel
10a Top end
11 Frame area
12A Array substrate
12B CF substrate
14 Liquid crystal layer
15 Sealing material
17A, 17B Polarizing plate
20 Plate-like member
20a Extended portion
25 Rotation shaft
30 LED element
31 Irradiation section
32 Light guiding plate
33 Reflection pattern
34 Reflective film
35 Front light receiving sensor
40 Light guiding section
42 Cover section
46 Optical sensor
50 Sun
51 Natural light
58 Irradiation light
61 Control device
62 Liquid crystal panel driving section
63 LED driving section
64 Movable section
65 External system
66 External power supply
80 Solar panel
100 Liquid crystal display device

The invention claimed is:

1. A liquid crystal display device capable of displaying an image, comprising:
a liquid crystal panel;
an irradiation section for irradiating the liquid crystal panel with light;
a control device for controlling driving of the liquid crystal panel; and
a plate-like member attached to a part of the liquid crystal panel; wherein:
a light guiding section for collecting natural light and propagating the light is located on a first surface of the plate-like member;
the light guiding section is connected to the irradiation section;
a plurality of optical sensors each for detecting an amount of light are provided on the first surface of the plate-like member;
the irradiation section includes a plurality of LED elements;
the control device is connected to an LED driving section for controlling an amount of light to be emitted from each of the plurality of LED elements;
the control device is connected to the optical sensors;
the control device is structured to control an amount of light to be emitted from each of the plurality of LED elements by use of the LED driving section based on the amounts of light detected by the optical sensors;
the plate-like member is pivotable about a rotation shaft located in the vicinity of a top end of the liquid crystal panel; and
a solar panel is located on a second surface of the plate-like member which is opposite to the first surface.

2. The liquid crystal display device of claim 1 wherein:
the control device is connected to a movable control section for controlling pivoting of the plate-like member; and
the movable control section is structured to control the pivoting of the plate-like member in accordance with an orbit of the sun.

3. A liquid crystal display device capable of displaying an image, comprising:
a liquid crystal panel;
an irradiation section for irradiating the liquid crystal panel with light;
a control device for controlling driving of the liquid crystal panel; and
a plate-like member attached to a part of the liquid crystal panel; wherein:
a light guiding section for collecting natural light and propagating the light is located on a first surface of the plate-like member;
the light guiding section is connected to the irradiation section;
a plurality of optical sensors each for detecting an amount of light are provided on the first surface of the plate-like member;
the irradiation section includes a plurality of LED elements and a light guiding plate;
the control device is connected to an LED driving section for controlling an amount of light to be emitted from each of the plurality of LED elements;
the control device is connected to the optical sensors;
the control device is structured to control an amount of light to be emitted from each of the plurality of LED elements by use of the LED driving section based on the amounts of light detected by the optical sensors; and
the light guiding section is connected to the light guiding plate of the irradiation section.

4. The liquid crystal display device of claim 1, wherein the optical sensors are each formed of a photoelectric conversion element.

5. The liquid crystal display device of claim 1, wherein:
a front light receiving sensor for detecting an amount of the natural light incident on a front surface of the liquid crystal display device is provided on the front surface;
the liquid crystal panel is a semi-transmissive liquid crystal panel in which a transmission mode of using light from the irradiation section and a reflection mode of using the natural light from the front surface are switchable to each other; and
the control device is structured to switch the liquid crystal panel to the transmission mode or to the reflection mode based on the amount of light detected by the front light receiving sensor.

6. The liquid crystal display device of claim 5, wherein the front light receiving sensor is located in a frame area of the liquid crystal panel.

7. The liquid crystal display device of claim 1, wherein:
the irradiation section is an edge-lit type backlight unit; and
the control device adjusts the amount of light to be emitted from each of the plurality of LED elements located in the irradiation section such that a variance among the amounts of light detected by the optical sensors is alleviated.

8. The liquid crystal display device of claim 1, wherein:
the plate-like member is pivotable about the rotation shaft located in the vicinity of a top end of the liquid crystal panel;
a solar panel is located on a second surface of the plate-like member which is opposite to the first surface;
the control device is connected to a movable control section for controlling pivoting of the plate-like member;
the movable control section is structured to control the pivoting of the plate-like member in accordance with an orbit of the sun;
a front light receiving sensor for detecting an amount of the natural light incident on a front surface of the liquid crystal display device is provided on the front surface;
the liquid crystal panel is a semi-transmissive liquid crystal panel in which a transmission mode of using light from the irradiation section and a reflection mode of using the natural light from the front surface are switchable to each other;
the control device is structured to switch the liquid crystal panel to the transmission mode or to the reflection mode based on the amount of light detected by the front light receiving sensor; and
when the liquid crystal panel is switched to the transmission mode, the control device controls the pivoting of the plate-like member by use of the movable control section such that the first surface of the plate-like member receives the natural light from the sun; and when the liquid crystal panel is switched to the reflection mode, the control device controls the pivoting of the plate-like member by use of the movable control section such that the second surface of the plate-like member receives the natural light from the sun.

9. The liquid crystal display device of claim 1, wherein in a state where the liquid crystal panel is located in a vertical direction, the first surface of the plate-like member is located between the vertical direction and a horizontal direction.

10. The liquid crystal display device of claim 1, which is a display device located outdoors for digital signage.

11. A method for controlling a liquid crystal display device for displaying an image by collecting natural light and irradiating a rear surface of a liquid crystal panel with the collected light, wherein:

the liquid crystal display device comprises:
  a liquid crystal panel;
  an irradiation section for irradiating the liquid crystal panel with light;
  a control device for controlling driving of the liquid crystal panel; and
  a plate-like member attached to a part of the liquid crystal panel;
a light guiding section for collecting the natural light and propagating the light is located on a first surface of the plate-like member;
the light guiding section is connected to the irradiation section;
a plurality of optical sensors each for detecting an amount of light is provided on the first surface of the plate-like member;
the irradiation section includes a plurality of LED elements;
the control device is connected to an LED driving section for controlling an amount of light to be emitted from each of the plurality of LED elements;
the control device is connected to the optical sensors;
the control device executes:
  a step (a) of acquiring data on the amounts of light detected by the optical sensors;
  a step (b) of calculating a variance of the data on the amounts of light; and
  a step (c) of adjusting an amount of light to be emitted from each of the plurality of LED elements such that the variance is alleviated;
the plate-like member is pivotable about the rotation shaft located in the vicinity of a top end of the liquid crystal panel;
a solar panel is located on a second surface of the plate-like member which is opposite to the first surface;
a front light receiving sensor for detecting an amount of the natural light incident on a front surface of the liquid crystal display device is provided on the front surface;
the liquid crystal panel is a semi-transmissive liquid crystal panel in which a transmission mode of using light from the irradiation section and a reflection mode of using the natural light from the front surface are switchable to each other;
the control device executes a step of switching the liquid crystal panel to the transmission mode or to the reflection mode based on the amount of light detected by the front light receiving sensor; and
when the liquid crystal panel is switched to the transmission mode, the control device controls the pivoting of the plate-like member such that the first surface of the plate-like member receives the natural light from the sun; and when the liquid crystal panel is switched to the reflection mode, the control device controls the pivoting of the plate-like member such that the second surface of the plate-like member receives the natural light from the sun.

\* \* \* \* \*